United States Patent [19]

Baumbach et al.

[11] Patent Number: 4,847,876
[45] Date of Patent: Jul. 11, 1989

[54] TIMING RECOVERY SCHEME FOR BURST COMMUNICATION SYSTEMS

[75] Inventors: Randall L. Baumbach, Arnold, Md.; Richard G. Berard, Chelmsford; Robert G. Curtis, Sudbury, both of Mass.

[73] Assignee: Raytheon Company, Lexington, Mass.

[21] Appl. No.: 948,276

[22] Filed: Dec. 31, 1986

[51] Int. Cl.[4] .......................... H04L 7/06; H03D 3/24
[52] U.S. Cl. ..................................... 375/113; 375/120; 370/104; 332/16 R
[58] Field of Search ............... 375/120, 118, 111, 113, 375/108, 110; 370/104; 332/16 R, 23

[56] References Cited

U.S. PATENT DOCUMENTS

| | | | |
|---|---|---|---|
| 3,622,913 | 11/1971 | Shipley | 332/16 R |
| 3,963,996 | 6/1976 | Skerlos | 331/117 R |
| 4,017,803 | 4/1977 | Baker | 375/120 |
| 4,063,193 | 12/1977 | Wilcox | 331/117 R |
| 4,169,248 | 9/1979 | Hongu et al. | 331/117 R |
| 4,286,237 | 8/1981 | James | 332/16 R |
| 4,321,483 | 3/1982 | Dugan | 375/120 |
| 4,561,101 | 12/1985 | Pinsard et al. | 375/108 |
| 4,565,975 | 1/1986 | Gegner et al. | 375/120 |
| 4,633,488 | 12/1986 | Shaw | 375/120 |

OTHER PUBLICATIONS

"Digital Communications by Satellite", J. Spiker, Jr. Prentice-Hall, 1977, pp. 429-437.

Primary Examiner—Robert L. Griffin
Assistant Examiner—Andrew J. Telesz, Jr.
Attorney, Agent, or Firm—Christopher L. Maginniss; Richard M. Sharkansky

[57] ABSTRACT

A timing recovery apparatus for a burst mode communication receiver. The apparatus provides for optimum sampling and digitizing of received data at a plurality of data rates. In particular, a VCO is phase-locked to a local frequency reference prior to data being received. A reference timing preamble transmitted prior to the data is filtered and fed to the VCO causing it to injection lock such that the VCO becomes phase aligned with the preamble. The VCO is then permitted to "free run" during data transmission and continues to operate at substantially the same frequency. A synchronous divider and multiplexer, responsive to the VCO, allows selection of sampling clocks for the plurality of data rates. The divider is forced to a known state during VCO injection locking, to assure that the sampling clocks have maintained the proper phase for optimal sampling at the corresponding data rate. Further, means is provided to monitor the frequency of the VCO. Should the VCO frequency drift more than a predetermined amount an indication of such is produced.

13 Claims, 4 Drawing Sheets

TIMING RECOVERY SCHEME FOR BURST COMMUNICATION SYSTEMS

The United States Government has rights in this invention pursuant to Contract No. DAAB07-78-C-0034 awarded by the United States Army.

This invention relates generally to digital communication systems, and more particularly, to timing recovery schemes for burst mode communication receivers.

One method of providing multiple access to a communication satellite is by time allocation, often referred to as time division multiple access (TDMA). Users of such a system are assigned time slots and thus receive transmitted data from the satellite in a burst, that is, data is contained in a serial bit stream of variable length. This serial bit stream includes a preamble portion (typically a string of alternating ones and zeros) and a data portion. The preamble portion is used to synchronize a local oscillator in the user's receiver. Such synchronization consists of generating a sampling clock signal having a phase and frequency such that each bit in the data portion of the serial bit stream is sampled at a predetermined time. This ensures maximum likelihood of an error-free estimation of the transmitted data. Synchronization is thus acquired during the preamble and for the remainder of the burst the sampling clock must be maintained. It is desirable for such synchronization to occur rapidly and for the sampling clock to exhibit little phase or frequency drift. Because phase and frequency drift is unavoidable, the preamble is retransmitted every so often in order to resynchronize the user's receiver. In systems requiring maximum data rates or where the preamble may be corrupted by noise or otherwise not always available this problem is exacerbated. A further complication arises when the receiver must be adapted for use with a number of satellites having different bit rates.

One known approach to this problem is to feed a phase-locked loop (PLL) with the preamble portion thereby providing a fairly frequency-stable signal. However, the phase of the PLL output signal may not be proper for optimal sampling. Additionally, the PLL can be slow to lock in certain circumstances, such as when the preamble is nearly 180° out of phase with the local oscillator. Other timing recovery approaches, such as that disclosed in *Digital Communications by Satellite*, by J.J. Spilker, Jr., Prentice-Hall, 1977, pp. 429-437, in particular FIG. 14-1, allow fast acquisition of the correct clock for optimum sampling. However, these synchronizers are designated to operate at one bit rate; receivers adapted for use at more than one bit require a separate synchronizer for each bit rate used.

SUMMARY OF THE INVENTION

It is therefore an object of this invention to provide a timing recovery apparatus capable of rapidly phase and frequency locking to a preamble signal of minimum length.

Another object is to provide a timing recovery apparatus capable of maintaining phase and frequency lock during intervals between successive preamble signals.

A further object is to provide a highly stable timing recovery apparatus thereby minimizing the need to retransmit preamble signals when phase or frequency lock is lost.

Yet another object is to provide such a timing recovery apparatus adapted for systems using a number of different bit rates without the need to resynchronize each time the bit rate changes.

A still further object is to minimize data transmission error rate by detecting when synchronization has been lost.

These and other objects are accomplished by a timing recovery apparatus including a voltage controlled oscillator (VCO) connected in a phase locked loop (PLL) circuit for outputting a clock signal. The VCO includes injection inputs for phase locking the clock signal to an input preamble. A sample switch and a very low droop rate hold circuit are placed at a frequency control input of the VCO to maintain the VCO when the injection inputs are inactive. The VCO is a highly stable oscillator including cross-coupled transistors having a shared resonant circuit. In operation, the VCO is first locked to a local oscillator at a frequency known to be near the desired operating frequency. When a preamble becomes available it is fed to the VCO via the injection inputs. During data transmission the hold circuit is activated to assist in stabilizing the VCO.

Additionally, a loss of lock indication signal may be provided by periodically comparing the present value of the hold circuit output with a previously stored value. If this comparison yields a difference greater than a certain predetermined amount, the loss of lock indication signal is activated.

A selectable frequency divider circuit disposed at the VCO output provides a way for the timing recovery apparatus to accommodate a number of data rates quickly and without resynchronizing each time the data rate changes.

BRIEF DESCRIPTION OF THE DRAWINGS

The foregoing and other objects, advantages and novel features of this invention become more evident from the following detailed description when considered together with the accompanying drawings, wherein.

DESCRIPTION OF A PREFERRED EMBODIMENT

Figure 1:
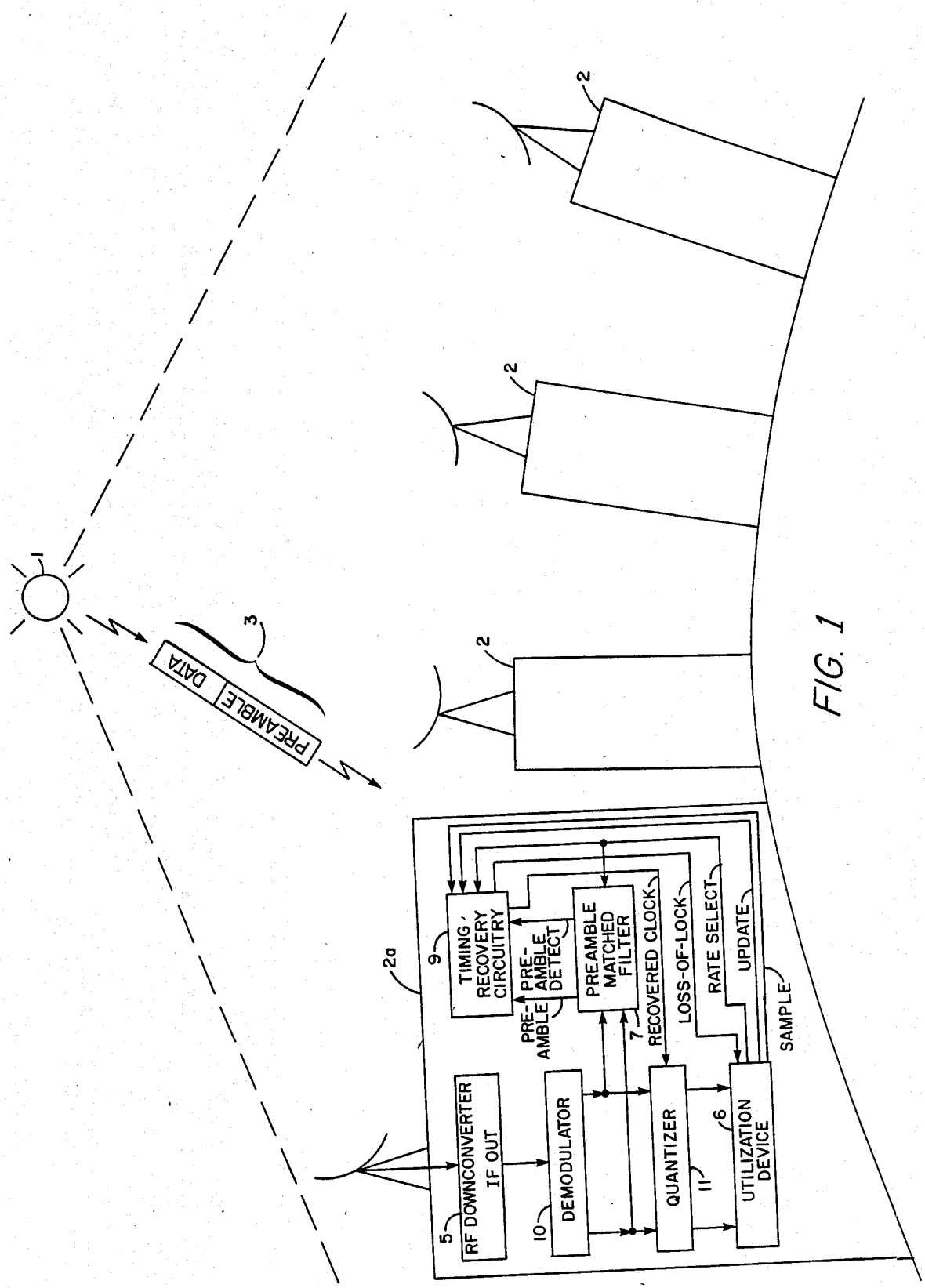
FIG. 1 diagrams a typical TDMA satellite communication system.

Referring now to the drawings, in which like reference numerals indicate like or corresponding parts throughout the several views, there is shown in FIG. 1 a typical TDMA satellite communication system. A satellite 1 orbits the earth (not numbered) and transmits a radio frequency (RF) signal. The RF signal is typically modulated in quadrature phase shift keying (QPSK) to produce an RF serial bit stream 3. The RF bit stream 3 is typically received by a plurality of widely spaced receivers 2. RF bit stream 3 consists of a data portion preceded by a preamble portion. The preamble portion is used as a synchronization burst common to all receivers 2 of RF bit stream 3. It typically is a series of alternating ones and zeros of predetermined length.

An exemplary one of the receivers, receiver 2a, shows the major components of each receiver 2. RF down converter 5 first translates RF bit stream 3 to an intermediate frequency (IF) data signal. Demodulator 10 demodulates the IF data signal to baseband in-phase (I) and quadrature (Q) data channels and feeds this I and Q baseband data to quantizer 11. Simultaneously, preamble matched filter 7, responsive to the utilization device 6 and the baseband I and Q data from demodulator 10, detects the presence of a preamble and passes the detected preamble to a timing recovery circuit 9. Timing recovery circuit 9 provides a RECOVERED CLOCK signal with proper phase and frequency for optimal sampling of the I and Q data by quantizer 11. Utilization device 6, typically a computer having stored therein a prior; knowledge of the data rate of RF bit stream 3, specifies via a RATE SELECT output the particular frequency of the RECOVERED CLOCK signal. It also configures preamble matched filter 7 to match the characteristics of the preamble so that matched filter 7 will detect and pass the PREAMBLE signal to timing recovery circuit 9. Timing recovery circuit 9 uses the PREAMBLE signal to generate the RECOVERED CLOCK signal. Quantizer 11 then samples and quantizes the amplitude of the baseband data on the I and Q data channels in response to the RECOVERED CLOCK signal from timing recovery circuit 9, for presentation to utilization device 6. The frequency of the RECOVERED CLOCK signal during periods when no RF bit stream 3 is received is held constant by utilization device 6 controlling timing recovery circuit 9 via the SAMPLE signal. The UPDATE signal allows utilization device 6 to request timing recovery circuit 9 to determine if the RECOVERED CLOCK is still accurate. If it is not, timing recovery circuit 9 provides an indication to utilization device 6 via a LOSS-OF-LOCK signal that a loss-of-lock condition has occurred. Upon receiving such an indication, utilization device 6 can take corrective measures such as performing error recovery calculations or requesting retransmission from satellite 1.

Figure 2:
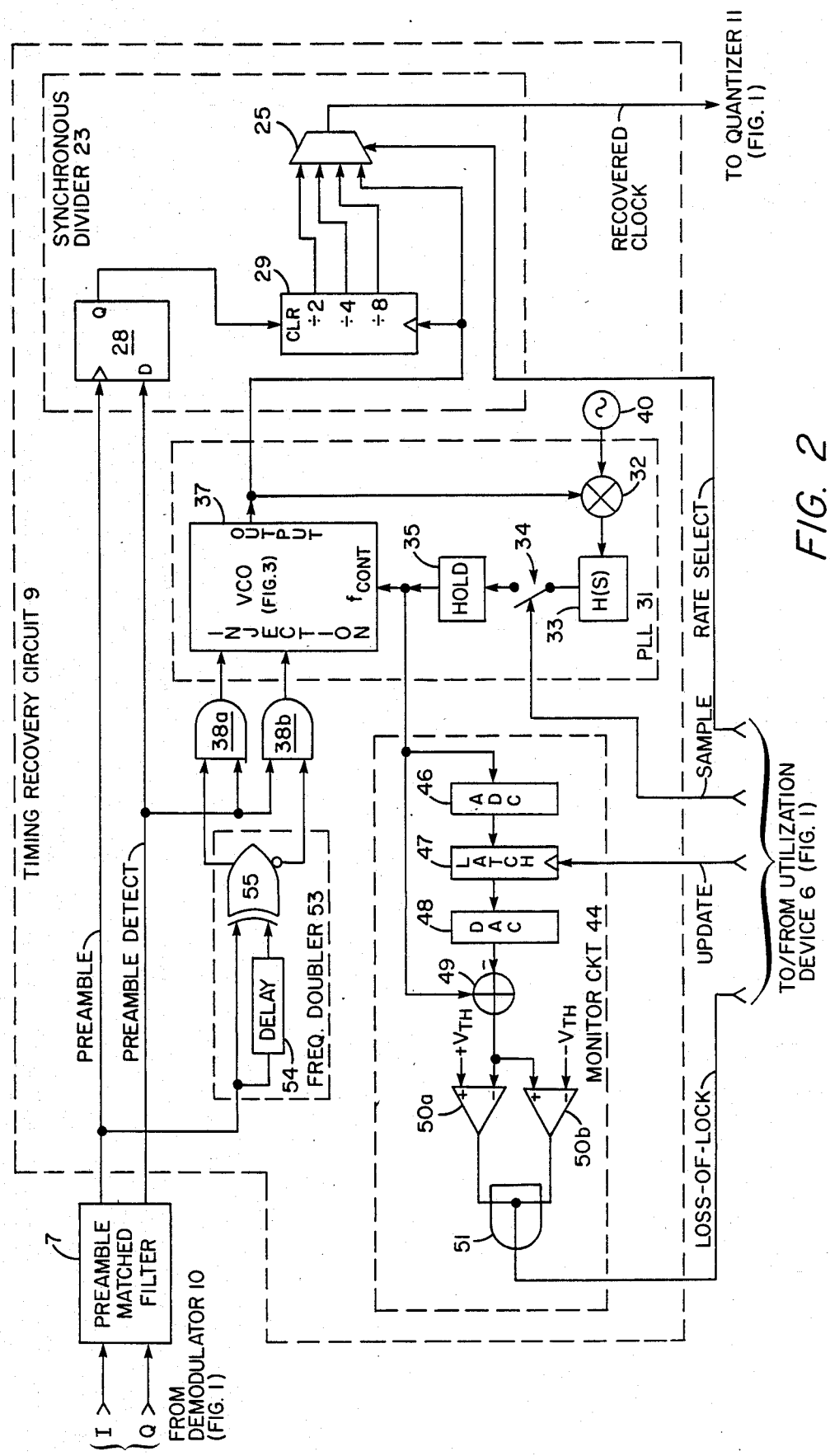
FIG. 2 is a block diagram of the timing recovery circuit in accordance with this invention.

Referring now to FIG. 2, timing recovery circuit 9 is shown with more detail, and seen to comprise phase locked loop (PLL) 31, AND gates 38a and 38b, reference oscillator 40, frequency doubler 53, monitor circuit 44 and synchronous divider 23.

Figure 4:
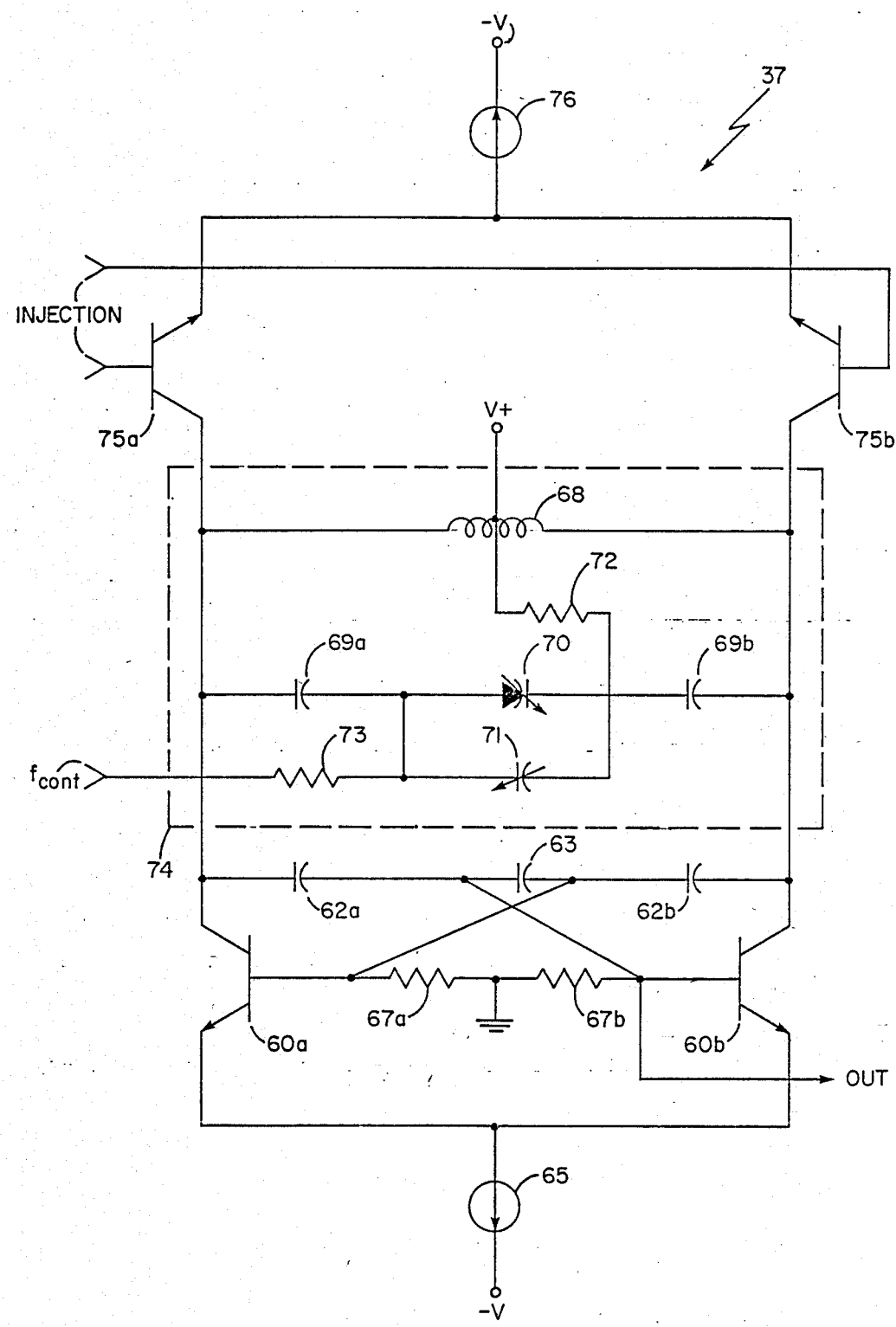
FIG. 4 is a schematic diagram of the improved high-stability voltage controlled oscillator showing circuitry for injection locking the oscillator to an external signal.

More particularly, PLL 31 is configured essentially as a conventional PLL, including a voltage controlled oscillator (VCO) 37, phase detector 32, and loop filter 33. VCO 37, to be discussed in greater detail in connection with FIG. 4, is a high-stability oscillator adapted to vary its frequency of oscillation in response to a control signal applied to a frequency control input ($f_{cont}$). VCO 37 is further adapted to allow injection locking to an external signal applied to injection inputs. Switch 34 and hold circuit 35 (forming a sample-and-hold circuit) assist in maintaining the frequency of VCO 37 close to a known desired frequency (40 MHz in the preferred embodiment) during intervals when no RF data stream 3 is being received. In particular, utilization device 6 forces switch 34 to close via an appropriate signal on the SAMPLE input thereby causing VCO 37 to lock in phase with a reference oscillator 40. When the SAMPLE signal is removed, switch 34 opens and hold circuit 35 maintains the voltage at the $f_{cont}$ input of VCO 37, thereby keeping the frequency of VCO 37 substantially the same as the reference oscillator 40.

However, PLL 31 guarantees only that the phase and frequency of VCO 37 is substantially the same as the reference 40 and not that required to correctly sample the data portion of RF bit stream 3. To obtain a clock with the exact frequency and also the proper phase for optimal sampling, the preamble portion of RF data stream 3 is injected into VCO 37 via injection inputs. The injection locking feature of VCO 37 and its operation is described with greater detail in later discussion of FIG. 4. Preamble matched filter 7 detects and provides the preamble portion from the I and Q channels output from demodulator 10. Exemplary preamble matched filters add the I and Q channels together and apply the sum to a plurality of bandpass filters, each filter corresponding to a predetermined data rate of RF bit stream 3. In the preferred embodiment, the plurality of bandpass filters is replaced by a switched-capacitor bandpass filter responding to the utilization device 6 for selection of the center frequency of matched filter 7. Since the preamble is an alternating one-zero pattern, if the filter is designed with a frequency response to match, the preamble will readily pass through. As the data portion is typically random, it is attenuated by matched filter 7. Additionally, a level detector (not shown) is included for detecting the presence of a preamble passing through matched filter 7 and providing the PREAMBLE DETECT signal.

In the preferred embodiment, the PREAMBLE signal from filter 7 is then fed to frequency doubler 53 for generating a signal twice the frequency of the alternating one-zero pattern of the demodulated preamble. As the alternating one-zero pattern has a frequency of one-half the rate of the data portion, the double frequency signal output from doubler 53 is thus equal to the rate of the data portion. The double frequency signal is provided by doubler 53 in true and complementary form for injection locking the VCO 37. It should be noted that the proper operation of frequency doubler 53 is independent of the data rate selected. Frequency doubler 53 is preferred to be a digital electronic circuit including a digital delay line 54 having a predetermined delay and an exclusive-OR gate 55 forming a differentiator. This delay is typically half the bit time of the highest expected data rate, so that in the preferred embodiment having an expected data rate of 40 MHz, the delay is 12.5 nanoseconds. The true and complement double frequency signals output from doubler 53 are coupled to AND gates 38a and 38b for selectively coupling the double frequency signal to the injection inputs of VCO 37 when the preamble matched filter 7 indicates the presence of a preamble. It should be understood that in other embodiments, the preamble might be set to a different rate relative to the data rate, i.e. equal to it. In such an instance, frequency doubler 53 is unneeded and the PREAMBLE signal is fed directly to AND gates 38a and 38b. As will be discussed in more detail shortly, the injection inputs of VCO 37 allow the phase of the preamble to be matched to rib the phase of the output from VCO 37, and VCO 37 maintains this phase after the preamble terminates by utilization device 6 providing an open command to switch 34 via the SAMPLE signal. The phase and frequency of the signal output from VCO 37 is now proper for sampling and quantizing the data portion of RF bit stream 3.

Thus, it has been seen how a signal with the proper phase and frequency is obtained. It is the function of monitor circuit 44 to indicate to utilization device 6 if and when the VCO 37 clock has drifted from the desired phase and frequency. This occurs, for example, when the signal output from hold circuit 35 drifts more than a predetermined amount while switch 34 is open (that is, PLL 31 is running open loop). When PLL 31 is phased locked to reference 40, it is also desired that utilization device 6 ignore any loss-of-lock condition from monitor circuit 44. Accordingly, analog-to-digital converter (ADC) 46 digitizes the control signal from hold circuit 35 for storing by latch 47. Once switch 34 opens (PLL 31 is open loop), latch 47, responsive to an UPDATE signal from utilization device 6, latches and holds the last digitized control signal from ADC 46 thereby forming a reference signal. Digital-to-analog converter (DAC) 48 then translates the digital reference signal in latch 47 back to analog form. UPDATE commands are periodically issued during transmission of data by utilization device 6. Subtractor 49 compares the analog reference signal from DAC 48 to the present signal from hold circuit 35, producing an error signal fed to comparators 50a and 50b. Comparator 50a compares the error signal to a predetermined upper threshold, $+V_{th}$, and comparator 50b compares the error signal to a predetermined lower threshold $-V_{th}$. The outputs of comparators 50a and 50b are wire-ANDed together (indicated by symbol 51) such that should the error signal exceed either threshold, a LOSS-OF-LOCK signal is generated for coupling to utilization device 6.

It is also desired that utilization device 6 be capable of selecting one of a number of data rates to be output for use by quantizer 11. This is accomplished by synchronous divider 23, seen to comprise synchronous binary counter 29, multiplexer 25 and D flip-flop 28 in the preferred embodiment. Counter 29, with a clock input fed by the output of VCO 37, provides output signals at one-half, one-quarter and one-eighth the frequency of VCO 37 output. It is imperative that these output signals from divider 29 be phase aligned with the output from VCO 37. This ensures they will have the desired phase for optimum sampling. Thus, counter 29 must be output-synchronous such as an MC10136 hexadecimal counter manufactured by Motorola Semiconductor Products, Inc. of Austin, Texas. Careful control of the clear input (CLR) of counter 29 also ensures its proper phase - this is the function of flip-flop 28. In particular, flip-flop 28 uses the PREAMBLE signal from matched filter 7 as a clock signal to sample the PREAMBLE DETECT signal. When the PREAMBLE DETECT signal is true, the Q output of flip-flop 28 is active, forcing counter 29 to a known state. When PREAMBLE DETECT becomes false, the Q output of flip-flop 28 then allows counter 29 to begin counting. Finally, multiplexer 25, fed by a RATE SELECT command from utilization device 6, selects one of the possible output signals from counter 29 to be used as the RECOVERED CLOCK fed to quantizer 11. In other embodiments, fine adjustment circuits (not shown and not part of this invention) are sometimes necessary and may be disposed to operate on the RECOVERED CLOCK signal before it is fed to quantizer 11.

Figure 3:
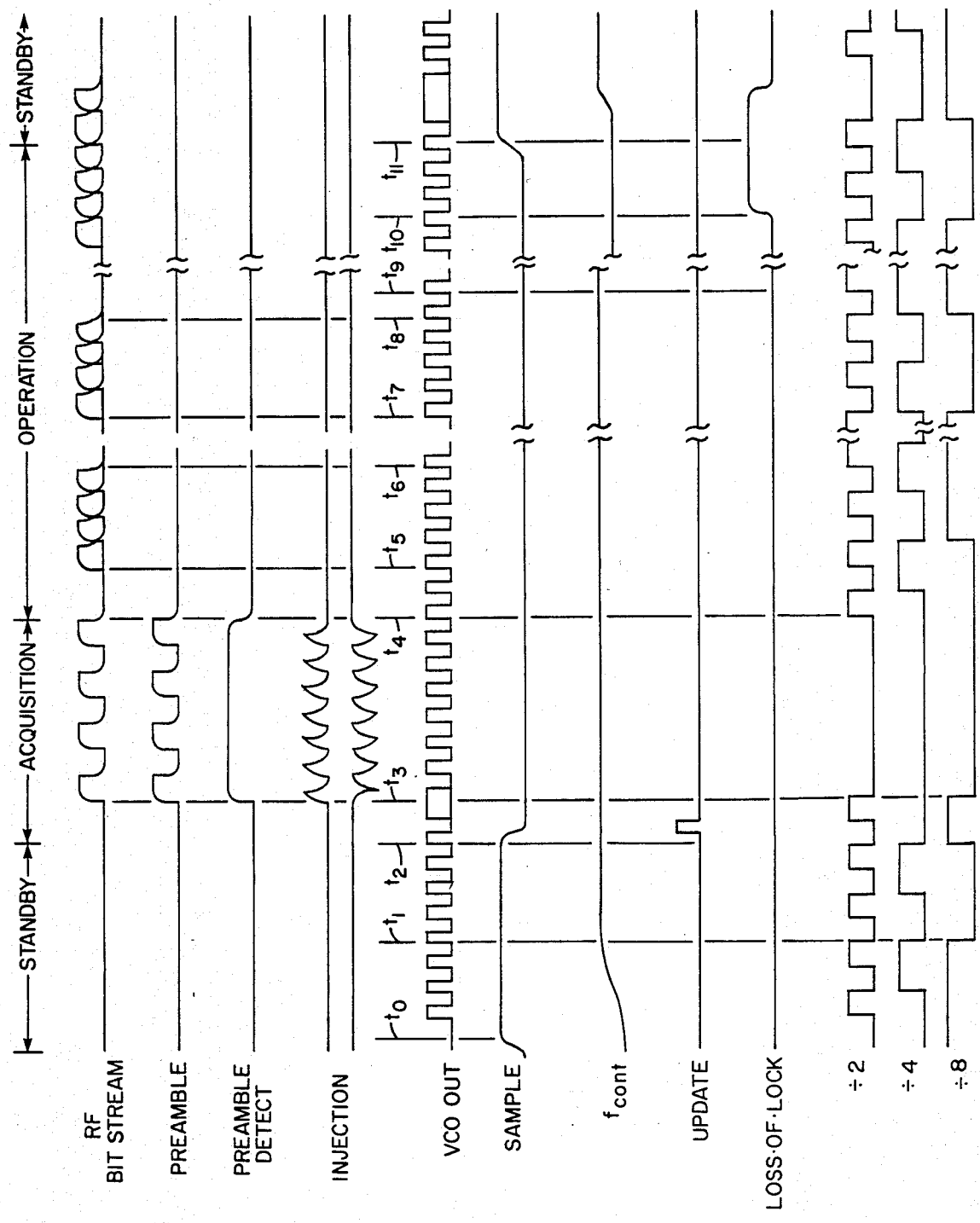
FIG. 3 is a timing diagram showing the operation sequence of the timing recovery circuit.

The typical operation of timing recovery circuit 9 and its control by utilization device 6 is thus divided into three modes including standby, acquisition and operation mode. A timing diagram useful in understanding these three modes appears in FIG. 3. In standby mode, when no RF BIT STREAM 3 has yet been received, such as at time $t_0$, utilization device 6 forces the SAMPLE signal active, thereby causing PLL 31 to phase lock VCO 37 to the internal reference 40. Thus as shown, by time $t_1$, VCO OUTPUT is a clock signal in phase and frequency lock with reference 40 and $f_{cont}$ has become a constant voltage. Synchronous divider 23, driven by VCO OUTPUT, begins generating and provides signals $\div 2$, $\div 4$ and $\div 8$ phase-synchronous with VCO OUTPUT. Acquisition mode begins at time $t_2$, after a sufficient period has elapsed to insure VCO 37 has phase-locked to internal reference 40, but before a time $t_3$ when it is known that RF BIT STREAM will be received. At this time $t_2$, the SAMPLE signal is set inactive by utilization device 6 thereby opening switch 34 to disable PLL 31 and enable monitor circuit 44. Also near time $t_2$ utilization device 6 provides an UPDATE pulse causing latch 47 to save the present value of $f_{cont}$ as the reference signal for monitor circuit 44. At $t_3$, the PREAMBLE signal begins outputting from matched filter 7 causing PREAMBLE DETECT to become active. Although only four cycles of PREAMBLE are shown, in actuality the required length is greater. Active PREAMBLE DETECT in turn causes frequency doubler 53 and AND gates 38a and 38b to provide complementary INJECTION signals. During this period, the phase and frequency of VCO OUTPUT signal becomes aligned with the INJECTION signals. As flip flop 28 in synchronous divider 23 is also activated, counter 29 is cleared and inhibited from counting as shown by signals $\div 2$, $\div 4$ and $\div 8$ changing coincidently with $t_3$ and holding. The operation mode begins at $t_4$ upon termination of PREAMBLE DETECT. In this mode, data portions of RF BIT STREAM 3 are present such as that indicated between times $t_5$ and $t_6$. As shown at times $t_7$ through $t_8$, additional data portions of RF BIT STREAM 3 may be sent without reentering acquisition mode. Although not shown in FIG. 3, if another preamble portion is indicated by the PREAMBLE DETECT signal becoming active while in operation mode, acquisition mode is reentered o relock VCO OUTPUT to a new PREAMBLE. Also at any time during operation mode, such as $t_9$, utilization device 6 may check the accuracy of VCO OUTPUT by sampling the LOSS-OF-LOCK signal. If $f_{cont}$ is still held relatively constant, no LOSS-OF-LOCK will have been given and thus no corrective action is necessary. However, at some later point $t_{10}$ in operation mode, $f_{cont}$ may drift sufficiently to cause monitor circuit 44 to output an active LOSS-OF-LOCK signal. In such an instance, utilization device 6 may cause timing recovery circuit 9 to reenter standby mode by activating the SAMPLE signal at $t_{11}$, causing VCO 37 to again be phase locked to internal reference 40 while waiting for another PREAMBLE.

Referring now to FIG. 4, VCO 37 is shown with more detail. Transistors 60a and 60b, along with constant current sink 65 form a differential transistor pair having corresponding bases and collectors cross-coupled by capacitors 62a, 62b and 63. The capacitance ratios of capacitors 62a and 62b to capacitor 63 is approximately 1:3, respectively, to impedance transform the relatively high output impedance of the corresponding collectors to the relatively low input impedance of the corresponding bases of transistors 60a and 60b. Resistors 67a and 67b bias corresponding transistors 60a and 60b into a linear amplifying condition. Collectors of transistors 60a and 60b couple to corresponding ends of coil 68, the center tap of which is coupled to a positive power supply V+(not numbered). Coil 68, along with series coupled capacitors 69a and 69b and voltage variable capacitance diode (VVC) 70 in parallel with variable capacitor 71, and resistors 72 and 73 form a parallel resonant tank circuit 74 for determining the resonant frequency of VCO 37. Capacitors 62a, 62b and 63 may also affect the resonant frequency of VCO 27 so their values must be chosen accordingly. The capacitance of VVC 70 varies inversely to the amount of voltage impressed across it, such voltage being established by resistor 72 coupling the cathode of VVC 70 to the positive power supply and resistor 73 coupling the anode of VVC 70 to a frequency control ($f_{cont}$) input. Variable capacitor 71 sets the nominal operating frequency of VCO 37, here 40 MHz. Transistors 75a and 75b, along with constant current sink 76, form another differential pair, the collectors of which couple to the corresponding collectors of transistors 60a and 60b for injection locking VCO 37. The injection inputs couple to corresponding bases of transistors 75a and 75b. Current sink 76 preferably sinks approximately four times the current of current sink 65 to insure proper injection locking. During injection locking, AND gates 38a and 38b (of FIG. 2) coupled to the injection inputs are enabled, thereby driving transistors 75a and 75b to alternately conduct, forcing oscillations in tank circuit 74 to be substantially in-phase and frequency with signals applied to the injection inputs. Thus, the phase of the output signal from VCO 37 follows any shift in phase of the signals applied to AND gates 56a and 56b. During periods of no injection locking, AND gates 56a and 56b are not enabled and transistors 75a and 75b conduct approximately equal currents allowing transistors 60a and 60b to operate unhindered. It is noted that in the preferred embodiment, transistors 60a, 60b, 75a and 75b and current sinks 65 and 76 are disposed on the same substrate to ensure close matching of the gain and temperature characteristics of these devices. Exemplary component values for VCO 37 to operate with high-stability at approximately 40 MHz are as follows:

| | |
|---|---|
| Capacitors 62a, 62b | 39 pF |
| Capacitor 63 | 100 pF |
| Resistors 67a, 67b | 10K ohm |
| Coil 68 | 0.4μH (metalized glass inductor) |
| Capacitors 69a, 69b | 100 pF |
| VVC 70 | 4–9 pF, MV1620 (Motorola Semiconductor, Inc., Austin, Texas) |
| Variable Capacitor 71 | 1–20 pF |
| Resistor 72 | 56K ohm |
| Resistor 73 | 56K ohm |
| Transistors 60a, 60b, 75a, 75b | p/o CA3049 (Radio Corp. of America, Princeton, New Jersey) |
| Current Sink 65 | 3 MA (p/o CA3049) |
| Current Sink 76 | 11.7 MA (p/o CA3049) |

Having described a preferred embodiment of this invention, it should now be apparent to one of skill in the art that other embodiments incorporating its concept may be used. For example, data rates other than one-half, one-quarter and one-eighth the output of VCO 37 may be supported by appropriately designed synchronous dividers 23. VCO circuits having an injection lock feature may be substituted for the embodiment shown in FIG. 4. It is felt, therefore, that this invention should not be restricted to the disclosed embodiment, but rather should be limited only by the spirit and scope of the following claims.

What is claimed is

1. In a circuit for receiving a bit stream in a burst mode communication system, the bit stream having a preamble portion and a data portion, a timing recovery apparatus adapted to provide a clock signal having a predetermined phase and frequency for sampling each bit of the data portion, the timing recovery apparatus comprising:

detection means, arranged to receive the bit stream, for detecting the presence of a preamble portion in the bit stream, and for outputting the preamble portion and a preamble detect signal indicating the presence of a preamble portion;

injection oscillator means, having an injection input, for providing the clock signal, the clock signal having a predetermined phase and frequency relationship with respect to a signal applied to the injection input; and coupling means, disposed between said detection means and said injection oscillator means, for coupling the preamble portion from said detection means directly into the injection input of said injection oscillator means when the preamble detect signal indicates the presence of a preamble portion.

2. Apparatus as recited in claim 1 wherein said injection oscillator means additionally maintains the clock signal at substantially the same frequency and phase for a period of time after the signal applied to the injection input is removed.

3. Apparatus as recited in claim 1 and additionally comprising:

synchronous divider means, responsive to the clock signal from said injection oscillator means and having a clear input, for providing a plurality of output signals sub-harmonically related to the clock signal from said injection oscillator means when the clear input is inactive and for forcing the plurality of output signals to predetermined states when the clear input is active;

means, fed by said detection means and driving the clear input of said synchronous divider means, for activating the clear input when the preamble detect signal output from said detection means indicates the presence of a preamble portion and for deactivating the clear input in synchronism with the termination of the presence of the preamble portion; and means, having as an output a divided clock signal, responsive to the clock signal from said injection oscillator means and the plurality of output signals from said synchronous divider means, for selecting one of such signals as the divided output signal.

4. Apparatus as recited in claim 1 wherein said coupling means comprises:

delay means, coupled to said detection means, for outputting a delayed preamble portion; and means, coupled to said detection means and said delay means, for producing a frequency doubled signal having a frequency twice that of the preamble portion, and for feeding the frequency doubled signal to the injection input of said injection oscillator means.

5. In a circuit for receiving a bit stream in a burst mode communication system wherein the bit stream has a preamble portion and a data portion, a timing recovery apparatus adapted to provide a clock signal having the proper phase and frequency for sampling each bit of the data portion of the bit stream, the timing recovery apparatus comprising:

frequency reference means, for outputting a reference signal;

oscillator means, responsive to a first control signal, for producing an oscillator output signal having a frequency determined by the first control signal, said oscillator means further having an injection input, the oscillator output signal being phase aligned with a signal applied to the injection input;

divider means, responsive to the oscillator output signal from said oscillator means, for producing the clock signal, the clock signal having a frequency equal to or sub-harmonically related to the oscillator output signal;

phase detector means, responsive to the oscillator output signal from said oscillator means and the reference signal from said frequency reference means, for producing a relative phase signal indicating the relative phase between the reference signal and the oscillator output signal;

filter means, responsive to the relative phase signal from said phase detector means, for producing a filtered signal;

sample-and-hold means, responsive to the filtered signal from said filter means, for producing the first control signal, and for selectively sampling and holding the filtered signal;

storage means, fed by said sample-and-hold means, for storing the amplitude of the first control signal and for producing a second control signal, the second control signal having substantially the same amplitude as the stored amplitude of the first control signal;

subtracting means, fed by said sample-and-hold means and said storage means, for subtracting the first control signal from the second control signal to form an error signal;

comparison means, fed by said subtracting means, for indicating when the error signal exceeds predetermined limits;

detector means, arranged to receive the preamble portion of the bit stream, for providing a signal indicating the data rate of the data portions of the bit stream; and coupling means, coupled to said detection means and said oscillator means, for coupling the signal indicating the data rate to the injection input of said oscillator means during the preamble portion of the bit stream.

6. Apparatus as recited in claim 5 wherein said storage means additionally comprises:

analog-to-digital conversion means, fed by said sample-and-hold means, for converting the first control signal to a digital word;

latch means, fed by said analog-to-digital conversion means, for selectively storing the digital word from the analog-to-digital conversion means; and digital-to-analog conversion means, fed by said latch means, for converting the stored digital word to the second control signal.

7. Apparatus as recited in claim 5 wherein said divider means additionally comprises:

synchronous counting means, fed by the oscillator output signal from said oscillator means and having a clear input, for producing a plurality of output signals sub-harmonically related to the oscillator output signal when the clear input is inactive and forcing the plurality of output signals to predetermined states when the clear input is active;

means, arranged to receive the preamble portion of the bit stream and coupled to the clear input of said synchronous counting means, for activating the clear input when the preamble portion of the bit stream is present and for disabling the clear input in synchronism with the termination of the preamble; and means responsive to the oscillator output signal from said oscillator means and the plurality of output signals from said synchronous divider means, for selecting one of such plurality of signals as the clock signal.

8. An apparatus responsive to a clock sequence contained in a bit stream, said bit stream additionally including a second sequence following said clock sequence, said apparatus providing a clock signal during said second sequence of said bit stream, said clock signal maintaining a substantially fixed phase and frequency relationship with said clock sequence, said apparatus comprising:

a phase lock loop including
a voltage-controlled oscillator having an injection input, for providing said clock signal,
a local frequency reference for generating a reference signal, and
phase detector means for providing a control signal to said oscillator indicative of the phase relationship between said clock signal and said reference signal;

means for injecting said clock sequence into said oscillator for aligning the phase of said clock signal with the phase of said clock sequence; and means for maintaining said clock signal at substantially the phase of said clock sequence during said second sequence.

9. Apparatus for providing a clock signal having a predetermined phase and frequency relationship with respect to a received signal, said received signal comprising a preamble portion and a data portion, said apparatus comprising:

a phase lock loop including
a voltage-controlled oscillator having an injection input, for providing said clock signal,
a local frequency reference for generating a reference signal, and
phase detector means for providing a control signal to said oscillator indicative of the phase relationship between said clock signal and said reference signal; and means for injecting said preamble portion into said oscillator.

10. A method for providing a clock signal having a predetermined phase and frequency relationship with respect to a received signal, said received signal comprising a preamble portion and a data portion, said method comprising the steps of:

(a) providing a phase lock loop including
a voltage-controlled oscillator having an injection input, for providing said clock signal,
a local frequency reference for generating a reference signal, and
phase detector means for providing a control signal to said oscillator indicative of the phase relationship between said clock signal and said reference signal; and (b) injecting said preamble portion into said oscillator to provide said clock signal.

11. A method as in claim 10 additionally comprising:
(c) detecting when the preamble portion is present; and (d) disconnecting the oscillator from the local frequency reference when the preamble portion is present.

12. A method as in claim 10 additionally comprising:

(c) detecting when the clock signal has drifted more than a predetermined amount.

13. A method as in claim 10 additionally comprising:

(c) synchronously dividing the clock signal to a lower frequency than the clock signal's frequency at the oscillator output

* * * * *